(12) United States Patent
Van Mourik et al.

(10) Patent No.: US 10,398,123 B2
(45) Date of Patent: Sep. 3, 2019

(54) PROTECTIVE DEVICE FOR A MILKING CUP, AND MILKING DEVICE COMPRISING THE SAME

(71) Applicant: LELY PATENT N.V., Maassluis (NL)

(72) Inventors: Jan Dirk Van Mourik, Maassluis (NL); Thomas Schenkels, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 168 days.

(21) Appl. No.: 15/548,794

(22) PCT Filed: Jan. 22, 2016

(86) PCT No.: PCT/NL2016/050049
§ 371 (c)(1),
(2) Date: Aug. 4, 2017

(87) PCT Pub. No.: WO2016/126155
PCT Pub. Date: Aug. 11, 2016

(65) Prior Publication Data
US 2018/0235172 A1 Aug. 23, 2018

(30) Foreign Application Priority Data
Feb. 6, 2015 (NL) ...................... 2014256

(51) Int. Cl.
*A01J 5/00* (2006.01)
*A01J 5/08* (2006.01)
(Continued)

(52) U.S. Cl.
CPC ................. *A01J 5/08* (2013.01); *A01J 5/044* (2013.01); *A01J 5/16* (2013.01)

(58) Field of Classification Search
CPC ........................................................ A01J 5/08
(Continued)

(56) References Cited

U.S. PATENT DOCUMENTS 6,308,656 B1 * 10/2001 Milbrath .................. A01J 5/08
119/14.47
6,742,475 B1   6/2004 McLeod et al.
(Continued)

FOREIGN PATENT DOCUMENTS

DE  20 2007 013 313 U1  1/2008
EP      0 908 091 A1   4/1999
GB      2 145 915 A    4/1985

OTHER PUBLICATIONS

International Search Report dated Jun. 7, 2016 in PCT/NL2016/050049 filed Jan. 22, 2016.

*Primary Examiner* — Richard T Price, Jr.
(74) *Attorney, Agent, or Firm* — Oblon, McClelland, Maier & Neustadt, L.L.P.

(57) ABSTRACT

A protective device for a milking cup including a milking cup part enclosing a portion of the milking cup at a location of a connection, the milking cup part including a wall. The milking cup part includes an opening in the wall for passing through at least one of a milk discharge line and pulsating line, and a single-part or multipart line part connectable to form a circumferential wall for enclosing at least a part of the at least one of the milk discharge line and the pulsating line. The line part is connected to the milking cup part around the opening in the wall, wherein the line part, from the milking cup part, successively encloses first, second, and third parts, wherein at least the third part is dimensionally stable and the second part is, for example, at least ten times more flexible than the third part.

11 Claims, 4 Drawing Sheets

(51) Int. Cl.
*A01J 5/04* (2006.01)
*A01J 5/16* (2006.01)

(58) Field of Classification Search
USPC ............. 119/14.01–14.03, 14.4, 14.41–14.49
See application file for complete search history.

(56) References Cited

U.S. PATENT DOCUMENTS

| | | |
|---|---|---|
| 2009/0077759 A1 | 3/2009 | Van Der Meijden et al. |
| 2009/0078836 A1 | 3/2009 | Linhart et al. |
| 2014/0033982 A1 | 2/2014 | Serafini |

* cited by examiner

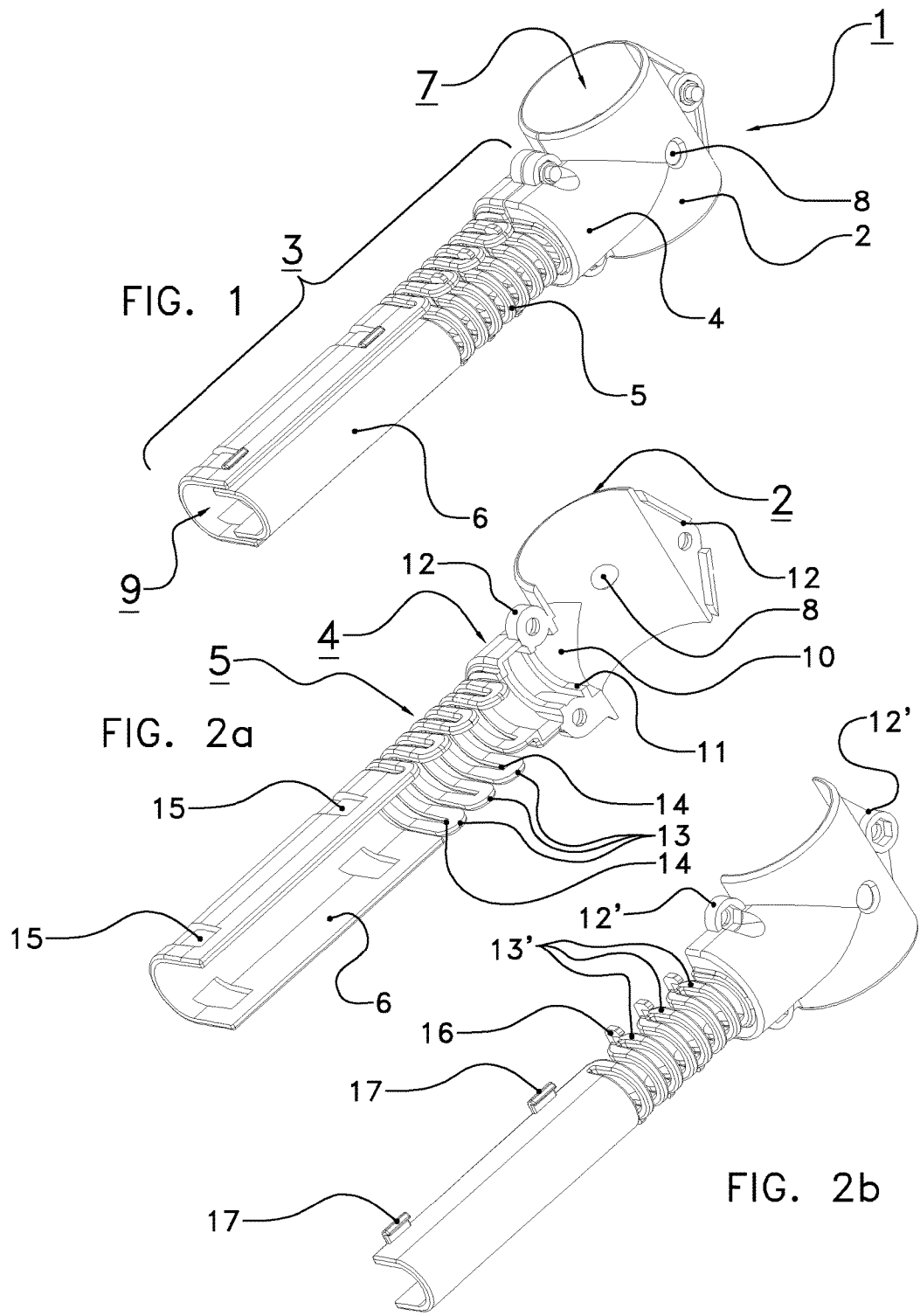

PROTECTIVE DEVICE FOR A MILKING CUP, AND MILKING DEVICE COMPRISING THE SAME

BACKGROUND

Field

The invention relates to a protective device for a milking cup, which milking cup has a teat opening which defines a longitudinal direction of the milking cup, wherein the milking cup is provided with a milk discharge line and a pulsating line. The invention also relates to a milking device comprising the same.

Description of the Background

A milking cup comprises a cup wall with a milking lining, and the milking cup is attached to a milk discharge line for discharging the milk milked by means of the cup, and to a pulsating line for alternately applying a vacuum and atmospheric pressure on the pulsation space between the milking lining and the cup wall. This attachment is usually effected by means of a connection nipple and/or hose clamp or the like.

One of the problems which may occur is the fact that a dairy animal sometimes becomes irritated by the milking cup and kicks it from the teat. Obviously, the animal may also inadvertently kick it or an operator may inadvertently stand on the connection. In all these cases, the connection will be subjected to great loads, resulting in the risk of rupture or other kind of damage. Obviously, this is undesirable, because it makes the milking device less reliable and results in increased replacement time and costs.

Another problem may occur, at least with some of the automated (robot) milking devices, when pulling back the milking cup to a rest position. The rest position is usually in a store, such as with the DeLaval VMS™, or on a robot arm on a milking cup holder, such as with the Lely Astronaut™ or GEA MIone™. The milking cup should preferably be pulled back to a well-defined rest position, because otherwise it will be more difficult to attach the milking cups to the teats of a subsequent dairy animal. In this case, a connection between the milking cup itself and the rest of the milking device which is as stiff as possible is advantageous. On the other hand, the milking cup is to be able to move as freely as possible when attached to a teat, in order to hinder milking as little as possible or run as little risk as possible of sliding off the teat.

It is an object of the invention to at least partly solve one or more of the aforementioned problems.

To this end, the invention provides a protective device according to claim 1, in particular a protective device for a milking cup, which milking cup has a teat opening which defines a longitudinal direction of the milking cup, wherein the milking cup is provided with a milk discharge line and a pulsating line, wherein at least one of the milk discharge line and the pulsating line makes an angle with the longitudinal direction at the location of a connection thereof to the milking cup which is unequal to zero, and preferably a substantially right angle, wherein the protective device comprises a milking cup part for enclosing a portion of the milking cup at the location of said connection, which milking cup part comprises a wall which is connectable to form a circumferential wall, wherein the milking cup part has an opening in the wall for passing through said at least one of the milk discharge line and the pulsating line, and a single-part or multipart line part which is connectable to form a circumferential wall for enclosing at least a part of said at least one of the milk discharge line and the pulsating line, wherein the line part is connected to the milking cup part around said opening in the wall, wherein the line part, from the milking cup part, successively encloses a first part, a second part and a third part, wherein at least the third part is dimensionally stable and wherein the second part is flexible in use.

The expression 'dimensionally stable' used herein is understood to mean that the shape of the respective part is at least stable during normal use during milking in a milking device. The part will then not (visibly) deform on account of its own weight or of components connected to it, such as the second and third parts of the line part or the milking cup part. This dimensional stability applies in particular to the third part, and for example also to the first part and the milking cup part. By contrast, during said normal use, the second part will be flexible in order thus to provide optimum freedom of movement for the milking cup. As used herein, "flexible in use" relates to the visible bending of the respective component solely by the weight of the components connected thereto during normal use, such as milking. It should be noted that the dimensional stability does not have to apply during fitting of the protective device around the milking cup and the one or more ducts. To this end, the protective device will after all have to be, for example, expanded or opened up. However, once it is fitted, the dimensional stability does apply.

Flexible hose protectors, such as sleeves, are known per se. Also from EP1484960. This document discloses a short milk hose between milking cup and milking claw which is configured to absorb impact loads by means of a shock-absorbing part with elongate absorption elements. At least use thereof in such conventional milking devices with milking claws does not present the problem of incorrect replacement, and therefore no assessment has to be made regarding the properties for replacement and those for protection of the (short) milk line.

SUMMARY

According to the present invention, it is thus possible to ensure that the milking cup can still hang from the teat to which it is attached during milking with a sufficient degree of freedom. This is due to the fact that the flexibility of the second part provides this freedom. Yet the line(s) is/are sufficiently protected due to the fact that the connection is surrounded by a dimensionally stable and strong first part, as a result of which an improved protection against being kicked off by dairy animals is provided. In this case, it may be mentioned that the line(s) passing through the line part may now be selected to be even more flexible, such as thinner, because the protection required at a distance further away from the dairy animal, such as deeper in the milking device, is smaller. If the line(s) is/are more flexible, then the milking device may overall be better capable of following the movements of the dairy animal and otherwise also function more reliably. At least more design options have been provided, so that the milking device can be better adapted to the circumstances.

A particular advantage of the present device is the fact that it can not only be applied by already being fitted to the milking cups in the factory, but may obviously also be fitted to existing milking devices. With all such milking devices (milking robots), the replacement reliability and the service life of the (short) milk line may increase. In addition, it is simple and hygienic to only replace any protective device which may be damaged by a kick from an animal or the like, instead of a short milk line or even the entire milking cup plus line. The impact or other load is then absorbed by the protective device, and the milking device does not have to be opened up, which the risk of contamination of milk, at least there is a reduction in the effort required to prevent this by cleaning and the like.

Specific embodiments of the invention are described in the attached dependent claims and in the following part of the description as well.

In particular, the second part is at least ten times more flexible than the third part. Thus, with sufficient protection of the line(s) and the connection to the milking cup, it is possible to provide a sufficient degree of flexibility not only to the second part, but also to the combination of milking cup, ducts and the protective device, in such a way that the milking cup, after having been attached to the teat, can readily move concomitantly therewith without falling off or the like. Furthermore, it is then also possible to make the line(s) itself/themselves more flexible, so that these can, in particular for the non-protected part, which will be situated deeper in the milking device, more readily bend when the line(s) are moved, as is the case with milking, when moving a robot arm or the like. The desired strength and rigidity are mainly provided, as it were, where they are also desired, namely close to the milking cup, in particular around the connection between the line(s) and the milking cup.

In embodiments, the protective device comprises two halves which are detachably attachable or attached, for receiving and enclosing said milking cup and at least one of the milk discharge line and pulsating line. In this way, the device according to the invention can simply be fitted in parts around the respective parts and said parts can be connected to each other. In this case, it is possible to movably connect the two halves on one side with a hinge or the like. In this case, it is not necessary to make the entire device expandable in order to be able to arrange the milking cup and/or ducts in the protective device, which could place particular demands on the materials to be used, although such an embodiment is not excluded. In another embodiment, the protective device is constructed as one unitary part, which part comprises a longitudinal gap, wherein the protective device is flexible in order to accommodate the milking cup and said at least one line, wherein the protective device is furthermore configured to connect opposite sides of the milking cup part and the line part to each other to form respective circumferential wall parts. When fitting the protective device around the milking cup and the line(s), the gap between the sides can be increased by pushing apart, after which the sides will spring back and after which the sides can be attached to each other to form the respective circumferential wall parts around the milking cup and the line(s), respectively.

In particular, the two halves or the two opposite sides are connectable to one another by means of one or more snap and/or bolt and/or screw connections to form the respective circumferential wall parts. Thus, it is for example possible in a very simple and quick way or by means of a pressure on the milking cup and/or line(s) which can be accurately determined, to produce a tight connection.

In embodiments, said second part has a meandering shape with recesses. A meandering shape can provide several degrees of freedom of flexibility, in particular to a component which is made from one material. Thus, in particular the first, second and third part, and preferably the two halves or even the entire protective device can be made of one material, except for an optional fastening means. This makes quick and efficient production by means of, for example, injection-molding possible. Other forms, such as a closed wall part made of a more flexible material, or the same material but with a thinner wall, etc., are not excluded.

The recesses are in particular transverse, not necessarily at right angle to the longitudinal direction of the milking cup. Preferably, the recesses extend over at least half the periphery of the second part. This ensures a relatively large degree of flexibility in several directions.

In particular, meandering arms in the line part extend in two directions and overlap in pairs at their respective ends. Advantageously, at least some of the meandering arms are provided with a fastening means at their respective ends, in such a manner that two overlapping meandering arms are detachably attachable to each other by means of said fastening means. Thus, it is also possible to provide a circumferential wall part around the line(s) for the meandering second part as well. Said fastening means is, for example, a hooklet which can hook behind the opposite meandering arm. Other closing mechanisms, such as hook and loop fastener, snap connections etc. are not excluded.

The material or the materials from which the protective device is made, is/are not subject to any particular limitation. Advantageously, an injectable plastic is therefore selected, more advantageously a plastic with a high maximum load and/or low moisture uptake and/or good resistance to the environment in animal sheds, such as nylon 12 (such as Grilamid PA12) or, for example, nylon 6 with up to 30% glass fiber filling, with other kinds not being excluded.

If a milking cup comprises at least one connection nipple at the location of the connection for at least one of the milk discharge line and the pulsating line, the first part extends in particular beyond the connection nipple, as measured from the milking cup. Thus, the connection of the line(s) to the connection nipple(s) is well protected against kicking and bending.

In embodiments, said first part comprises a hose clamp for clamping at least one of the milk discharge line and the pulsating line to the connection nipple. This makes it possible to attach the line(s) to the milking cup in a more simple manner, such as by sliding onto a connection nipple. Since the protective device is then attached to the milking cup and the line(s) and comprises a hose clamp, this may assume the function of the hose clamp which was often required in the past. It is an advantage that this hose clamp may be incorporated in the protective device, for example molded at the same time.

In advantageous embodiments, the line part has an elongate cross-sectional profile which is suitable for receiving both the milk line and the pulsating line. Partly due to the fact that thus both ducts are protected and a self-aligning effect may also occur when pulling back the milking cup due to the asymmetric shape, the reliability of the milking device can be increased further.

The invention also relates to a milking device provided with a plurality of milking cups, each having a protective device according to the present invention, as well as a robot device for automatically attaching the milking cups to the teats of a dairy animal. Such a milking robot would benefit from, on the one hand, a strong connection of one or more ducts to the milking cup and, on the other hand, a sufficiently rigid construction which ensures the automatic reliable replacement in a rest position. The reason for this is that it has to be possible to find this resting place without human supervision in a reliable manner, in order then to be able to also reliably reattach or otherwise prevent malfunction of the milking robot. The embodiments mentioned for the protective device also apply to the milking device according to the invention.

In embodiments, the milking cups are provided with a pullback means for pulling back the milking cup to a rest position, in particular on a robot arm of the robot device. Such replacing means are known, for example, from the Lely Astronaut™, wherein the milking cup is provided with a small piece of string at the bottom by means of which the milking cup can be pulled back onto a milking cup holder on the robot arm. During this pullback procedure, it is possible for the milking cup to assume a position with respect to the robot arm, and in particular with respect to the milking cup holder, which is too (excessively) oblique or otherwise incorrect to be able to reliably return. The invention prevents this by means of the protective device which increases the rigidity of at least part of the line close to the milking cup without excessively increasing the rigidity of the remaining part of the line, in particular the pulsating line, which would make pulling back, but also milking more difficult. The invention thus also provides rigidity where it is desired. In particular embodiments, the pullback means is therefore a separate pullback means, comprising a cord or chain or the like, which is attached on the underside of the milking cup, wherein both the milk discharge line and the pulsating line, at the location of their connection to the milking cup, make an angle with the longitudinal direction which is unequal to zero, and preferably a substantially right angle. In other embodiments, the pullback means is the milk discharge line, wherein the milk discharge line is attached to the milking cup in the longitudinal direction of the milking cup. The pulsating line then is at right angles thereto and is enclosed by the protective device.

In particular, the milk discharge line and the pulsating line are both accommodated in the line part next to each other. Not only are both ducts thus protected by one and the same component, that is to say the protective device. It is also advantageous that an additional resistance to rotation is provided around the ducts by the two ducts which lie next to each other, at least a certain or improved self-aligning ability is provided. This additional rigidity, at least the self-aligning ability, thus stabilizes the milking cup still further with respect to the robot arm, which increases the reliability during replacement and thus during subsequent attachment of the milking cups.

BRIEF DESCRIPTION OF THE DRAWINGS

The invention will now be explained in more detail with reference to the drawing, which shows a few non-limiting embodiments, and in which:

FIG. 1 diagrammatically shows a perspective view of a protective device according to the invention;

FIGS. 2a and 2b show two halves of the protective device according to FIG. 1, in a perspective view;

DETAILED DESCRIPTION

Figure 3:
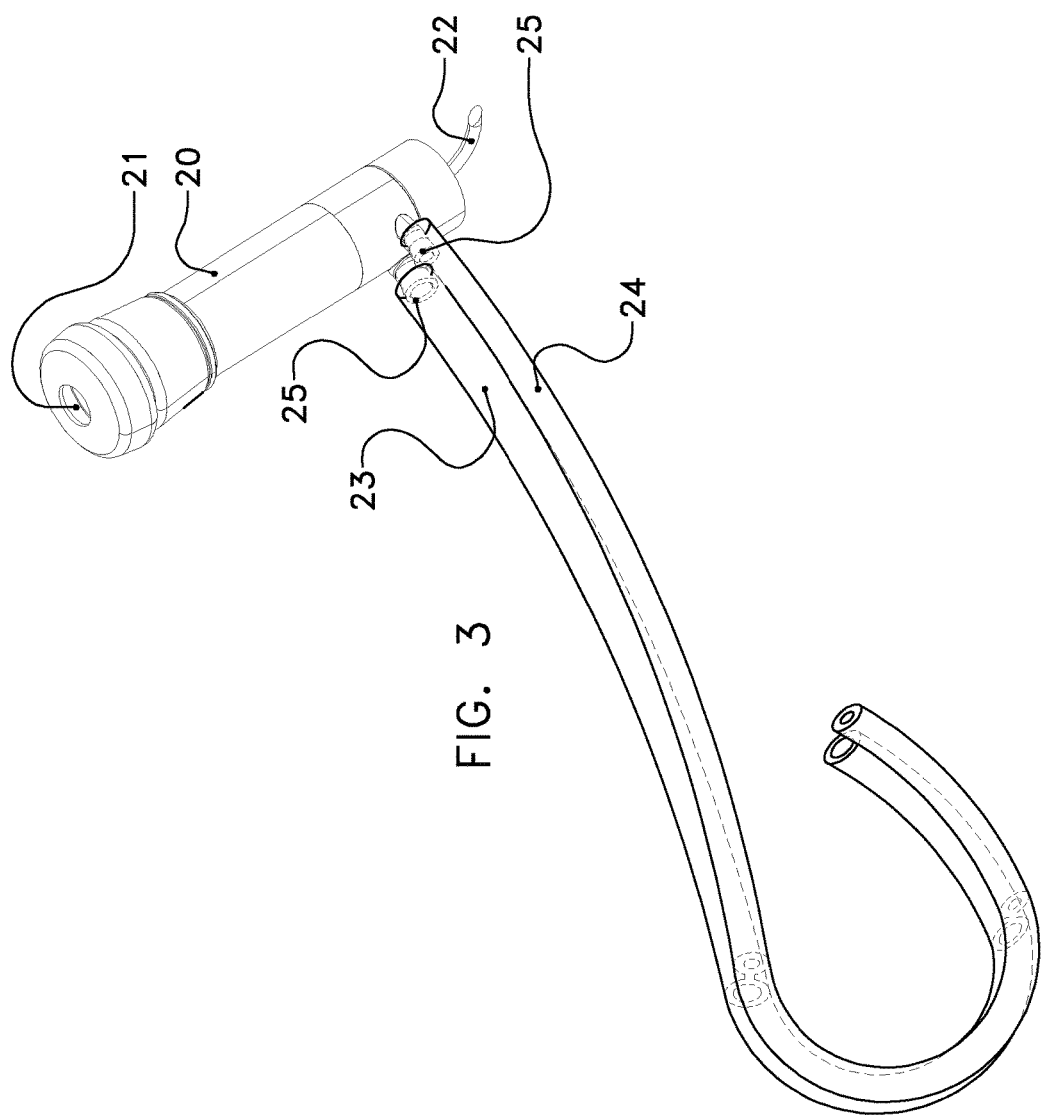
FIG. 3 diagrammatically shows a perspective view of a prior-art milking cup with ducts.

FIG. 1 diagrammatically shows a perspective view of a protective device according to the invention which is generally denoted by numeral 1. The device comprises a milking cup part 2 and a line part 3, which in turn successively comprises (viewed from the milking cup part) a first part 4, a second part 5 and a third part 6. Reference numeral 7 denotes an opening for the milking cup which is not shown here, and reference numeral 8 denotes an opening for a small vent hole of the milking cup. The cavity or opening for the line(s) through the line part is denoted by reference numeral 9.

Here, the protective device 1 is shown as being composed of two parts. This will be explained further with reference to FIG. 2a/b. In practice, in the assembled form, a milking cup will be accommodated in the opening 7 of the milking cup part. The pulsating line which is connected to the milking cup (not shown here) is often connected to the side of the milking cup, and will then run through the line part 3 of the protective device 1. The angle which the line part 3 makes with the milking cup part 2 obviously depends on the angle which the line(s) make(s) with the milking cup, and may also often be an acute angle. However, in the illustrated embodiment, the first part 4 is at right angles to the milking cup part 2, as is suitable, for example, for Lely™ milking cups. The first part 4 merges into the second part 5, which here consists of two meandering parts which have been connected to each other in a mutually overlapping way. This provides flexibility in several directions, so that the milking cup has the necessary freedom of movement during milking, with only a small risk of the teat falling in case of sudden movements. The second part 5 in turn merges into the third part 6, in general an elongate part which closely adjoins the line(s) to be accommodated therein. The entire protective device 1 substantially consists of relatively rigid plastic, so that the parts 2, 3 and 5, which are in use during milking, are dimensionally stable. Due to the shape of the component 5, the inherent rigidity of the plastic is not sufficient to provide a dimensionally stable part, but this flexibility is exactly that which is desired for this part.

Many milking cups also have an air supply in order to ensure good transportation of milk, either in the form of a small hole or in the form of a separate air supply line. In order not to hinder this, the milking cup part 2 often comprises an opening 8 for such an air supply.

FIGS. 2a and 2b show two halves of the protective device according to FIG. 1, in perspective view. In this case, similar components are denoted by the same reference numerals, if appropriate with an added accent. In addition, an opening 10 and, in the first part 4, a hose clamp 11, as well as fastening means 12 and 12', respectively, can be seen. The second part 5 comprises meanders 13 and 13', respectively, with recesses 14 and recesses 14 and hooklets 16, and the third part 6 comprises securing openings 15 and hooklets 17, respectively.

The opening 10 provides a passage for line(s) in the line part 3 to (the milking cup in) the milking cup part 2. The latter comprises fastening means 12 and 12', respectively, such as a bolt connection here. The first part 4 here also comprises a pressing means 11 which can serve as a hose clamp, so that this does not have to be attached separately. The second part 5 comprises meanders 13 provided with recesses 14 in the one (left-hand) half, and meanders 13' likewise provided with recesses in the other (right-hand) half and also hooklets 16 at both ends thereof. When enclosing line(s) in the line part 3, these hooklets 16 may engage in the recesses 14 in the opposite half. It should be noted that the right-hand half also has hooklets on the underside, which are not visible here, so that a circumferential part 5 can be formed. Finally, the third part 6 has respective wall halves with securing openings 15 and hooklets 17, respectively, again above and below, so that these halves can also be combined to form a circumferential part around line(s).

FIG. 3 diagrammatically shows a perspective view of a milking cup with ducts, as is known per se from the prior art. The milking cup 20 has a teat opening 21 for accommodating a teat and a pullback means opposite in the form of a cord 22. Furthermore a milk line 23 and a pulsating line 24 are which are attached to respective connection nipples 25 by pushing them on. The ducts 23 and 24 are here attached to the milking cup 20 at a right angle to the longitudinal axis thereof. The milk line may also be attached to the milking cup 20 on the underside, instead of the cord 22. The pulsating line 24 may also be attached at a different angle, such as at an acute angle and hanging down. Furthermore, not shown are hose clamps to clamp the ducts on to the connection nipples. The illustrated milking cup is attached to a teat by means of a robot arm (not shown) in order to milk the former. After milking, the milking cup 20 is pulled back onto the robot arm by means of the cord 22, at least with, for example, the Lely Astronaut™ system.

Figure 4:
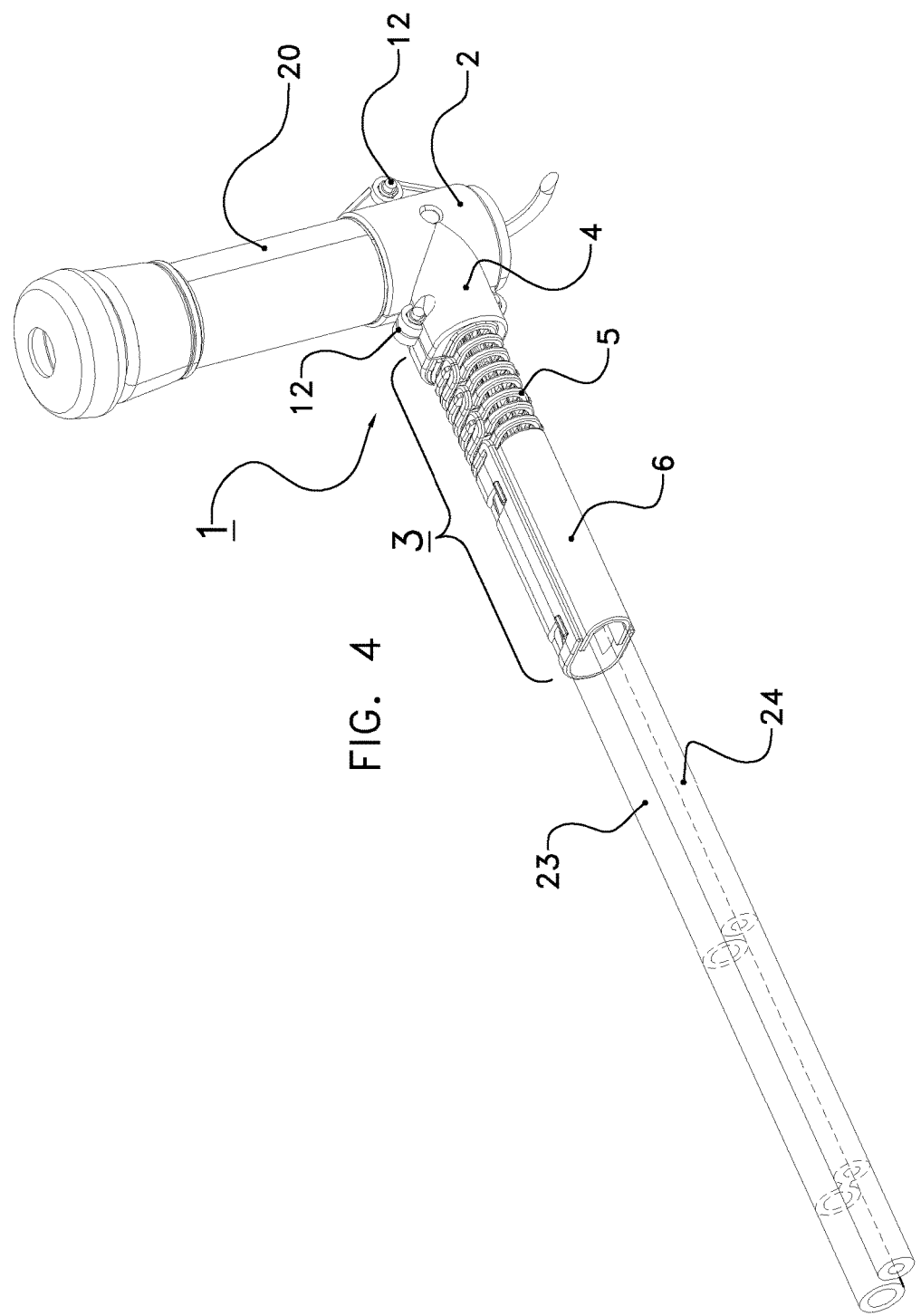
FIG. 4 diagrammatically shows a partly cut-away perspective view of a milking cup 20 with the protective device 1 according to the invention.

FIG. 4 diagrammatically shows a perspective, partially cut-away view of a milking cup 20 comprising the protective device 1 according to the invention. The milking cup 20 is accommodated in the milking cup part 2 and the ducts, here the milk line 23 and the pulsating line 24, are accommodated in the line part 2, thus successively in the first part 4, the second part 5 and the third part 6. It should be noted that only part of the ducts 23 and 24 is accommodated in the line part 3. The connection nipples which are not visible here are situated entirely in the first, dimensionally stable part 4, which projects slightly beyond the nipples with respect to the milking cup 20. The latter has sufficient freedom of movement during milking, while the ducts 23 and 24 and the connection thereof to the milking cup 20 are well protected by the protective device 1. In practice, it suffices to fit the halves shown in FIG. 2*a/b* around the milking cup 20 and ducts 23 and 24, respectively, and to securely fasten the halves around the milking cup and the ducts by means of the fastening means shown there, such as the means 12 and the hooklets 16 and 17.

Figure 5:
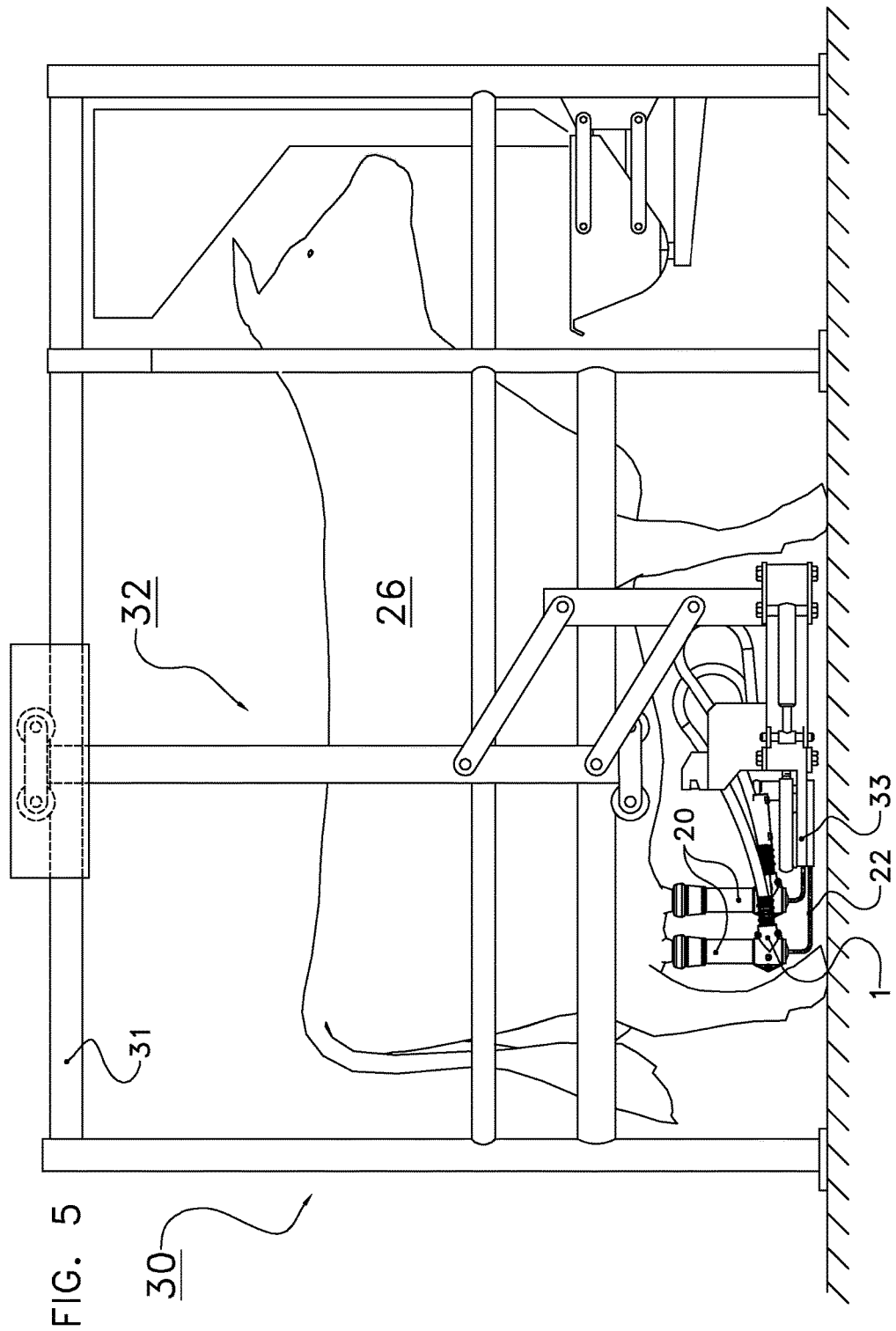
FIG. 5 diagrammatically shows a side view of a milking device 30 according to the invention during milking.

FIG. 5 diagrammatically shows a side view of a milking device 30 according to the invention during milking. It comprises a milking stall 30 for milking a dairy animal, such as a cow 26. The milking device furthermore comprises a milking robot 32 which, inter alia, includes a robot arm 33. During milking of the cow 26, the milking cups 20 are attached to its teats. The milking cups are provided with the protective device 1, inter alia to protect the connection of the line and the milking cup. The cow is able to move and in this case the milking cups 20 will have to follow and will thus have to be able to move with respect to the robot arm 33, at least in those cases in which the robot arm 33 cannot immediately follow the movements of the cow. While moving, it is possible for the milking cups to change angle with respect to the vertical, with respect to the milking and pulsating line, etc. To this end, it is advantageous if the protection does not hamper this movement, for which purpose the second part 5 (see inter alia FIG. 1) has been provided.

After milking, the milking cups 20 will be pulled to their rest position on the robot arm 33, which is incidentally not shown in more detail here. During this pullback movement, a milking cup 20 could hook behind, for example, an end of the arm 33, which is obviously undesired. This could occur in particular due to the milking cup 20 rotating about the ducts 23, 24. It is precisely this which can be prevented by, in particular, the third part 6 of the protective device 1, by effectively increasing the torsional stiffness of the combination of the adjacent ducts, in particular by said third part. Incidentally, all that which has been stated in this description in relation to the milking cups with lateral connection of the milk line 23 also applies to milking cups with a milk line which is in line with the milking cup and a pulsating line which is attached at right angles to the milking cup. In this case, the protective device will mainly protect the connection of the pulsating line against being stepped on by the cow 26 or by an operator, etc.

The invention claimed is:

1. A protective device for a milking cup, the milking cup including a teat opening that defines a longitudinal direction of the milking cup, a milk discharge line, and a pulsating line, wherein at least one of the milk discharge line and the pulsating line makes an angle with the longitudinal direction at a location of a connection thereof to the milking that is unequal to zero, the protective device comprising:
 a milking cup part for enclosing a portion of the milking cup at a location of the connection, the milking cup part including a wall connectable to form a circumferential wall, the milking cup part including an opening in the wall for passing through the at least one of the milk discharge line and the pulsating line; and
 a single-part or multipart line part connectable to form a circumferential wall for enclosing at least a part of the at least one of the milk discharge line and the pulsating line, wherein the line part is connected to the milking cup part around the opening in the wall;
 wherein the line part, from the milking cup part, successively encloses a first part, a second part, and a third part, wherein at least the third part is dimensionally stable and wherein the second part is flexible in use, and is at least ten times more flexible than the third part.

2. The protective device as claimed in claim 1, comprising two halves that are detachably attachable, by one or more snap and/or bolt and/or screw connections, for accommodating and enclosing the milking cup and at least one of the milk discharge line and pulsating line.

3. The protective device as claimed in claim 1, wherein the second part has a meandering shape including transverse recesses.

4. The protective device as claimed in claim 1, wherein the milking cup, at the location of the connection, includes at least one connection nipple for the at least one of the milk discharge line and the pulsating line, and the first part, as measured from the milking cup, extends beyond the connection nipple.

5. The protective device as claimed in claim 1, wherein the first part comprises a hose clamp for clamping at least one of the milk discharge line and the pulsating line to the connection nipple.

6. The protective device as claimed in claim 1, wherein the line part has an elongate cross-sectional profile configured to receive both the milk line and the pulsating line.

7. A milking device comprising:
 a plurality of milking cups, each including a protective device as claimed in claim 1, and a robot device for automatically attaching the milking cups to teats of a dairy animal.

8. The milking device as claimed in claim 7, wherein the milking cups include a pullback means for pulling back the milking cup to a rest position, on a robot arm of the robot device.

9. The milking device as claimed in claim 8, wherein the pullback means is the milk discharge line, wherein the milk discharge line is attached to the milking cup in the longitudinal direction of the milking cup.

10. The milking device as claimed in claim 8, wherein the pullback means is a separate pullback means, comprising a cord or chain, which is attached on an underside of the milking cup, wherein both the milk discharge line and the pulsating line, at the location of the connection thereof to the milking cup, make an angle with the longitudinal direction that is unequal to zero.

11. The milking device as claimed in claim 10, wherein the milk discharge line and the pulsating line are both accommodated in the line part next to each other.

* * * * *